United States Patent
Minca

Patent Number: 5,465,369
Date of Patent: Nov. 7, 1995

[54] NETWORK STRUCTURE FOR PARALLEL SOFTWARE PROCESSING

[76] Inventor: Ion Minca, Sos. Colentina nr. 83, B1.85, sector 2, Bucharest, Romania

[21] Appl. No.: 75,556

[22] PCT Filed: Mar. 12, 1992

[86] PCT No.: PCT/RO92/00005

§ 371 Date: Jun. 10, 1993

§ 102(e) Date: Jun. 10, 1993

[87] PCT Pub. No.: WO93/07571

PCT Pub. Date: Apr. 15, 1993

[30] Foreign Application Priority Data

Oct. 10, 1991 [RO] Romania .................. 148526

[51] Int. Cl.[6] ............................................. G06F 13/00
[52] U.S. Cl. ............... 395/200.03; 395/406; 395/375; 395/650; 395/200.08; 395/479; 364/228.1; 364/228.2; 364/232.1; 364/242.94; 364/247.4; 364/DIG. 1
[58] Field of Search .................. 395/800, 500, 395/200, 325; 364/228.1, 228.2, 232.1, 242.94, 247.4, DIG. 1

[56] References Cited

U.S. PATENT DOCUMENTS

| | | | |
|---|---|---|---|
| 4,720,784 | 1/1988 | Radharkrishnan | 395/325 |
| 5,043,870 | 8/1991 | Ditzel et al. | 395/375 |
| 5,129,077 | 7/1992 | Hillis | 395/500 |
| 5,136,717 | 8/1992 | Morley et al. | 395/800 |
| 5,157,778 | 10/1992 | Bischoff et al. | 395/200 |

FOREIGN PATENT DOCUMENTS

| | | |
|---|---|---|
| 0402891A2 | 12/1990 | European Pat. Off. |
| 0429305A2 | 5/1991 | European Pat. Off. |
| 0428938A2 | 5/1991 | European Pat. Off. |
| 0427023A2 | 5/1991 | European Pat. Off. |
| 3801361A1 | 8/1988 | Germany. |

OTHER PUBLICATIONS

"Communication in Parallel Processing Systems" by I. Georgescu, Studi and Research in Computers & Informatics, vol. 1, No. 1, Mar. 1990.

Primary Examiner—Alyssa H. Bowler
Assistant Examiner—John Harrity
Attorney, Agent, or Firm—Herbert Dubno

[57] ABSTRACT

A network for parallel processing for high performance parallel processing systems. Such a network solves the network communication problem by making use, in its nodes, of large size memory units capable of being simultaneously accessed by several processing units installed on the network edges intersecting that node. The processing units provide a large number of high performance virtual processors performing processing operations on both the two memories between which the processing unit is connected and transfer operations therebetween.

1 Claim, 2 Drawing Sheets

NETWORK STRUCTURE FOR PARALLEL SOFTWARE PROCESSING

CROSS REFERENCE TO RELATED APPLICATIONS

This application is a national phase of PCT/RO 92 00005 files 12 Mar. 1992 and based, in turn, on Romania national application 148526 filed 10 Oct. 1991 under the International Convention.

1. Field of the Invention

The invention relates to a network for parallel processing of logic programs intended to provide a highly parallel processing system to be used in fields in which data processing performances should be very high.

2. Background of the Invention

High performances in data processing have been obtained with parallel processing whereby the processing processes are decomposed into components distributed among concurrently operating equipement. Among the well-known parallel processing structures are: the pipeline architecture and multiprocessor architecture (Bell,C. G., Newell, A.—Computer structures: reading and exemples, McGraw-Hill Book Comp., New York, 1971; Treleaven, P., Vanneski, M.—Future parallel computers, Springer Verlag, Berlin, 1987).

The pipelining procedure is an approach to parallel processing at the instructions bit level: Instruction are analyzed and decomposed into constituent operations and then each of the operations is executed on dedicated serially connected units. The output of a preceeding unit s taken over by the subsequent unit which, after having executed the appropriate operations, transfers the output to the next unit. (Chen, T. C.—Parallelism, pipelining and computer efficiency, Computer Design, January 1971).

Well-known systems have benefitted from such a structure for increasing their performances (Flores, I.—Lookahead control in the IBM System 370/165, Computer no. 11, vol. 7, Nov. 1974; Thornton, I. E.—Parallel operation in the Control Data 6600, AFIPS Proc. FJCC, part. 2, vol. 26, 1964, pp.34–40).

However, pipeline structures are sometimes inefficient because the large percentage of branch instructions (about 25%) frequently slows down the pace further the line should be emptied of those instructions which had previously been taken from memory. The interrelations between instructions often cause deadlocks in processing. With different servicing time for the constituient units of the connecting line the only way of rendering the line throughput uniform is to use several units installed at one line node for parallel operations which makes control difficult. Also on the interrelations between instructions often does not allow an efficient use of the units installed to run in parallel. Given the complexity and the temporal character of the instructions, a range of few cycles to tens of cycles, their lack in uniformity bears on the performance of the equipment and complicates its supervision. The method best applies to those systems where processing is highly uniform (vector processing, array processing, image processing, etc.) and is mainly associated with supercomputers (Weiss, S., Smith, J. E.—Instruction issue logic in pipe-linead supercomputers, IEEE Trans. on Comp., C-33, no. 11, Nov. 1984).

Parallel processing with several processors of which interconnection is made by one of the well-known methods (Zakharov, V.—Parallelism and array processing, IEEE Trans. on Comp., Jan. 1984; Georgescu, I.—Communication in parallel processing systems, Studies and Researches in Computer and Informatics, vol. 1, no. 1, March 1990): shared memory (common bus, crossbar switch) or network (tree, ring, array, hypercube, etc.) is characterized by the fact that a plurality of stand-alone processors, each of them processing an individual job, are connected in a geometrical configuration. A common bus connection of several processors to a memory limits the configuration to that bus throughput, thus making it a critical point of the structure. As to those configurations that make use of a crossbar switch, enabling the access of each processor to each memory module, they have the handicap of a complex interconnection system, the complexity of which increases with the product of the number of connected devices. With different types of networks (tree, ring, torus, hypercube, etc.), the distribution, communication and supervision of processing jobs come to play a decisive role as the network size increases. One of the best known achievements in this field connects in a hypercube-like network 64K nodes, each node including a 4 kb cell memory and a low-granularity processor which works with a limited set of instructions on a few bit operands. A network communication unit is host to each 16 nodes. (Hillis, D. H.—The Connection Machine, MIT Press, Cambridge, 1985). The main characteristics of this system include a low-granularity of the processor which narrows its applicability to peculiar problems (large size vectors and other similar data structures) and makes performance are highly dependent on the aplication area. The performance will be poorer if the problem distribution over the structure is badly made. On the other hand, a fine granulation involves the need for higher level of data transfer within the network. Programming such a network, using it and communicating within it raise problems which may not be solvable. Machines with high-granularity conventional processors whose structure is not necessarly uniform, but, since the existing networks do not solve the communication problems, such a network seldom includes tens or at most hundreds of processors. (Hockney, R. T., Jesshope, C. R.—Parallel computers, Adam Higler Ltd., Bristol, 1981).

OBJECT OF THE INVENTION

It is an object of the invention to provide in achieving a network structure for parallel processing of logic programs, capable of solving the communication problem as well as facilitating solution to other processing job distribution and supervision.

The network architecture for parallel processing of logic programs, in conformity with the invention, makes use of a connection in a network topology where the nodes include large size memory units which allow several processing units, operating on the network edges intersecting at that node, have concurrent access to them. The processing units provide many high-granularity virtual processors capable of both carrying out processing jobs on the two memories connected to the processing unit and transfer ring jobs between the two memories bridged by the respective processor.

The processing unit is composed of a program activation unit which includes a program address stack and can exercise the control over the current instruction location computation, over the execution of jumps and over program state changes, a memory instructions reading unit which receives the orders from the program activation unit and retrieves instructions from the memory or from its cache memory and stores them on instruction buffers within an order interpretation block which receives instructions from the instructions buffers, analyzes them, compute the operands' addresses and stores them on a register access buffers situated at the input of a general register block or on a memory access buffers situated at the input of a memory operand reading unit, equipped with a cache memory. The general register blocks, after the operands are read, store them in operand buffers situated at the input of an execution block which takes over operands from the operands buffers, execute the required operation and stores the result on a general register writing buffer which can write the result in the general register block and at the same time update block. The processing unit also includes executes the transfer of data between the two memory units to which the processing unit is connected, and a control unit receiving, via the memory connection buses, the control commands for start, stop and testing of the processes from the processing unit, to each process being allocated one virtual processor obtained by virtualizing the shared installed physical resources.

The invention has the following advantages:

- it enables parallel job processing at procedure level, high granularity of processing, with easy distribution and efficient control of the jobs to be processed in parallel;
- it uses large clusters of processors with shared memory communication within the clusters and diminished communication between clusters via a network;
- it constitutes an efficient communication network, of which throughput and communication channels are adapted to traffic requirements, network redundancy and reliablity;
- it allows use of processing unit with best sizing of the installed equipment, taking into consideration the instruction set parameters, the technology applied, the algorithms used, their modularity contributing to developing reliable and fault-tolerant units;
- it enables the use of a processing unit whose homogeneous and modular structure helps in designing the integrated circuits and;
- the parallel processing systems' performances do not depend on the structure of the data to be processed (whether regular or not).

BRIEF DESCRIPTION OF THE DRAWING

The above and other objects, features, and advantages will become more readily apparent from the following description, reference being made to the accompanying drawing in which.

SPECIFIC DESCRIPTION

The network of the invention has large size memory units M0, M1, M2, M3 . . . at the network nodes connected by several processing units UP0, UP1, UP2, UP3 . . . installed in the network branches intersecting at that node, with concurrent access to each node. Each processing unit representing a large number of virtual processors for carrying out processing jobs on both of the two memories connected by the processing unit and transferring jobs between the two memories connected by the processing unit. Each memory unit has an interprocess control block contributing to the communication process in the network.

Figure 1:
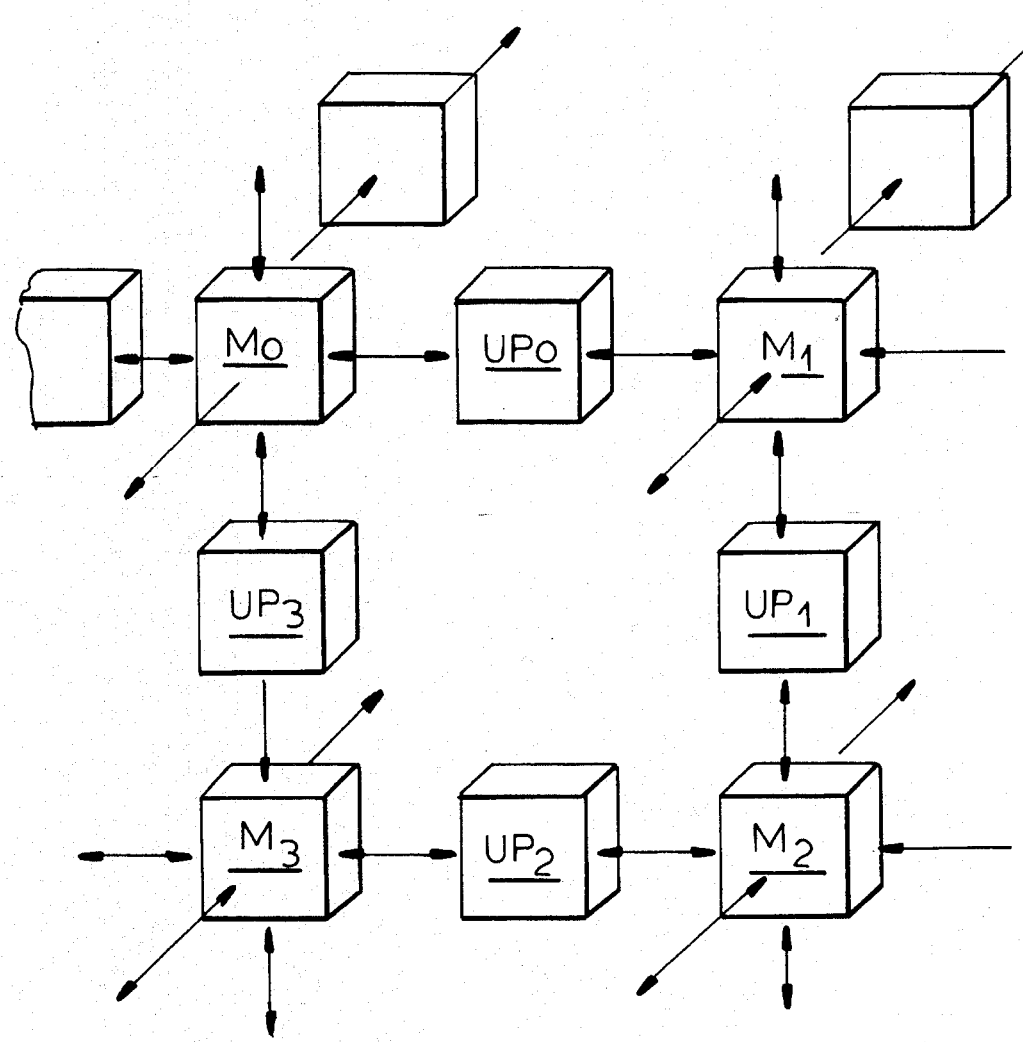
FIG. 1 is a diagram of the hypercube-like processing network making use of a processing unit to the invention.
Figure 2:
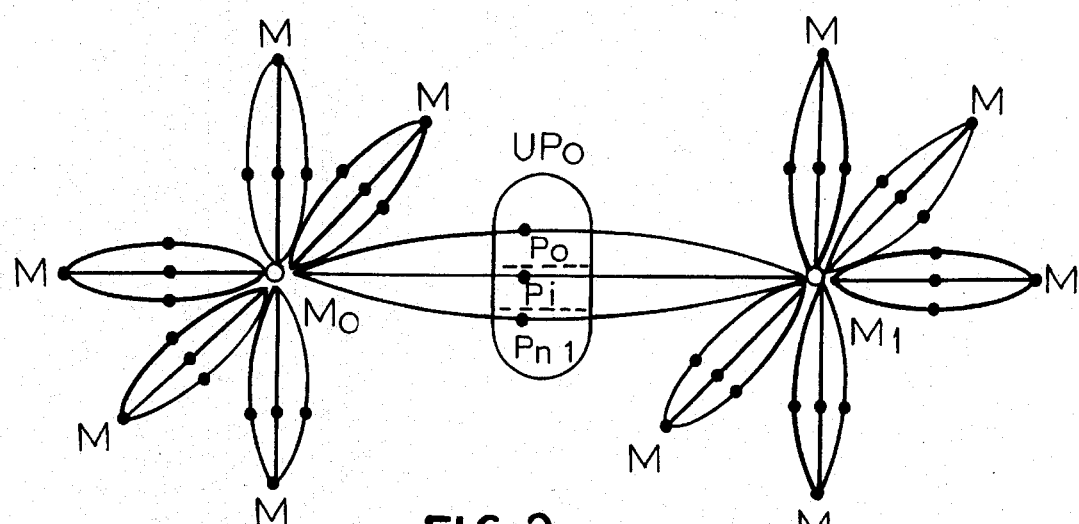
FIG. 2 is a diagram of the connections between two nodes of the processing network by the virtual processors, by means off which the processor clusters making up the nodes and the communication channels are explained.

FIG. 2 presents the diagram of the connection of two nodes in the processing network where M0 and M1 memories are located, explaining the P0, P1, . . . , Pn−1 virtual processors represented by the UP0 processing unit, the clusters of 6*n processors existing in each node (n stands for the number of virtual processors developed by a processing unit), as well as the n communication channels to the neighboring nodes where memories are located, marked by M in FIG. 2, based on n virtual processors, any of them being capable, depending on the current demands, of performing processing or transfer jobs on the two memories, to which it is connected. Instructions are available within the same program in both memories a jump instruction will be used for going from one sequence to the other.

Two processors in a cluster of processors around a node will communicate with one another via the memory located on that node (shared-memory communication). Two processors, no matter which, in various clusters of the network will communicate with one another as follows: the emitter process stores the message structured according to an interprocessor communication protocol in the memory. From there the message is sent via network, based on the "store and send" principle. In order to take place, the process is initiated by the processor which the emitter process runs on. It activates an interprocess control block which is part of any memory unit in each node. The command, the processor location, the type of command instruction, etc. are sent by access buses to one of the two memory units to which the process is connected, as required by the communication procedure. Once activated, the interprocess control block sends a command instruction for process interrupt and switching to the virtual processor of which address has been previously received. The virtual processor addressed by the command switches the process on the communication procedure, within which there takes place the required transfer between the two memories to which it is connected. Once the transfer is completed, an algorithm helps in selecting the address of that virtual processor which is going to carry on the communication process and through the access bus to the memory unit taking the message is sent the chosen virtual processor address and the command for activating the interprocess control block connected to the memory. When the communication procedure is over, one switches on the interrupt process. Further, the procedure takes as many iterations as necessary for the message reception by the addressee.

Figure 3:
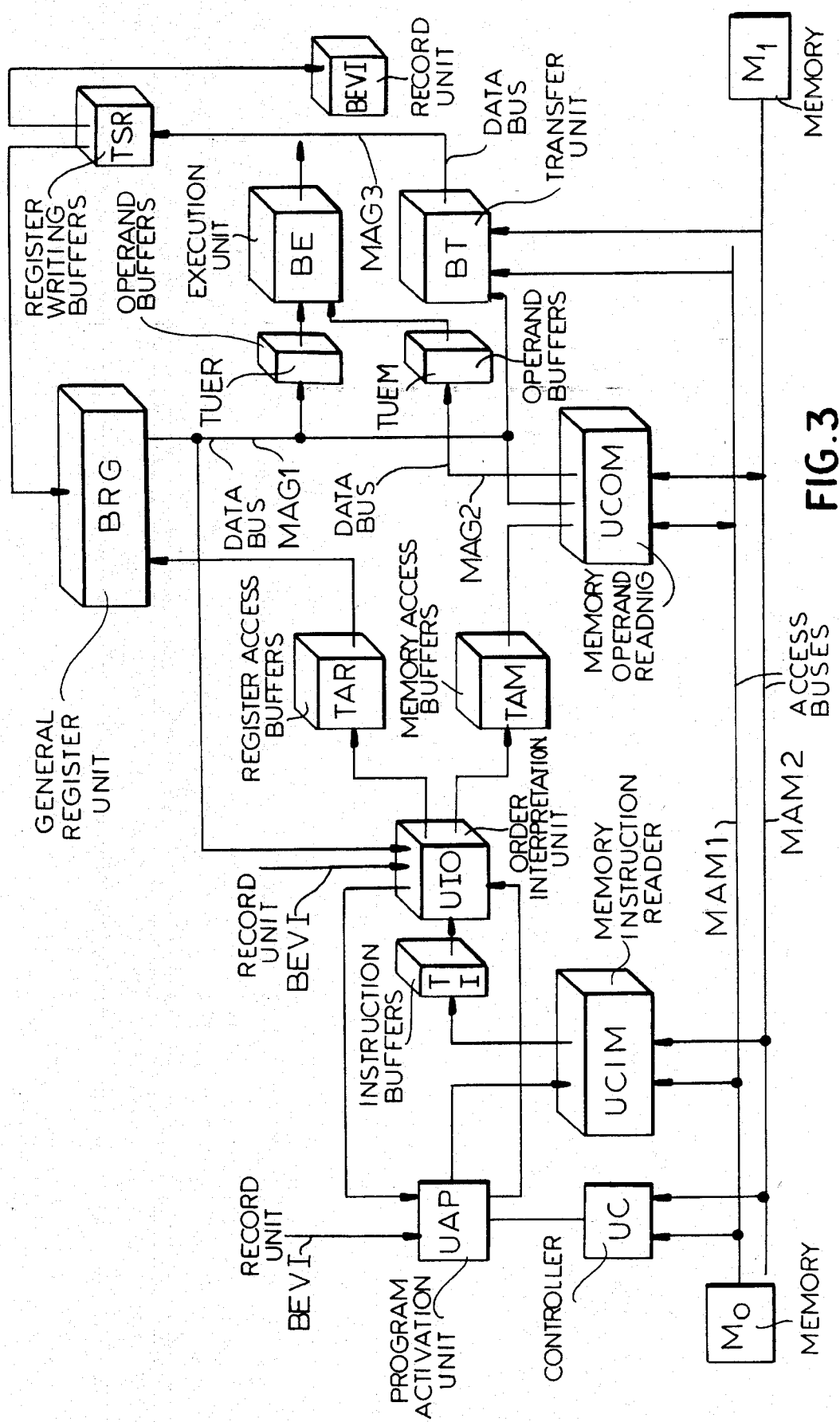
FIG. 3 is a block diagram of the processing unit.

According to our invention, the processing unit (FIG. 3) is composed of program activation unit, UAP, which includes a stack of program addresses and a control for the current instruction address computation, for the execution of jumps, for program state changes based on the operation parameters' situation and on the indications of a record block called BEVI. The program activation unit also acts as a mixer for processing programs combining a progresive scanning of programs with a launching into processing, in sequential cycles of, one instruction or two instructions (as allowed by the process state) of each program.

A memory instruction reading unit, UCIM, takes over the orders from the program activation unit and retrieves the instructions from memory, unless they are present in a cache memory with which the unit is equipped. A block of instruction buffers, TI, receives the instructions read by UCIM. An order interpretation block, UIO, receives the instructions from the instruction buffers, interprets them, computes the operand' addresses and stores these associated with the type of job, the execution unit address and other parameters indicating the way the job is executed in the register access buffers TAR, or in memory access buffers TAM, except for the jump instructions when the jump address is sent to the program activation unit where the jump operation is executed.

A general register block BRG includes general registers and has two stand-alone access gates for reading, if accessed by TAR buffers, and for writing, if accessed by register writing buffers, TRS; the gates are controlled by a priority access mechanism. The read operands are sent via a data bus MAG 1 and stored on operand buffers TUER. A memory operand reading unit UCOM, following the access queries in TAM and, in the case that the information is missing from a cache memory, with which the unit is equipped, it starts the access procedure to the memory and sends the read operands via a data bus MAG 2 and stores them on operand' buffers TUEM. An execution block BE, includes execution units per types of operations, each type having an appropriate number of execution units installed so that the required processing throughput should be obtained. The TUER, TUEM buffers deliver the operands, the type of operation and the parameters on how the operation is processed and the execution block executes the operation and sends the result on a data bus MAG 3 for storage in the register writing buffers TRS. Besides storing the result in the general register block BRG, the register writing buffer TRS update certain operation parameters existing on the records block BEVI, an forming a control system for the whole processing unit. This control system covers all the units of the processing unit, the buffers and buses, and is based on parameters, addresses, labels for the instructions and operands pervading the units.

A transfer block BT consisting of unit thereby the information is transferred between two memory units, M0 and M1, the units being connected by two access buses MAM 1 and MAM 2. The transfer orders are taken the same way as the execution unit BE takes the current orders. The general registers provide the transfer addresses, the amount of data to be transmitted; after completing the transfer, the parameters are updated and stored in BRG. A control unit UC receives from the access buses, MAM 1 and MAM 2, the control commands necessary for the unit process start, stop and testing.

The processing unit combines different types of parallelism: parallel processing of a number of programs, instruction of a program being parallel processed both by pipeline method and by parallel execution of many operations in the execution part. The number of programs is dependent on the set of instructions, features of instruction (addressing, complexity, etc.), the algorithms used in execution part, the technology used, the expected performances, the statistical features of phenomena in the processing unit, etc. The instructions of the programs to be processed are combined with one another by a progressive scanning of programs, with one or two instructions provided by each program in successive cycles, accordingly with the state of corresponding processes. In this case the flow will run without any interrelations between the successive instructions pertaining to various programs—an ideal situation for processing in a pipeline structure. The steady-state is achieved because of a large number of running programs and the phenomena in the processing unit will be statistically processed and the installed equipments will be rigorously dimensioned. Thus, the programs share the installed physical resources, organized on a pipeline structure, the resources being assigned only temporarily, accordance with momentary need. By this treatment the physical resources are virtualized: each program will be assigned a virtual processor, their connection being a shared-memory communication type with one single bus for getting access to a memory and the possibility for accessing two memories where processing or transfer jobs between the two memories can take place concurrently.

I claim:

1. A network structure for parallel processing of programs including a plurality of network nodes interconnected by a plurality of network branches terminating at each node, said network structure comprising:

a plurality of processing units in said branches, each of said network branches comprising one of said processing units;

a plurality of memory units distributed at said nodes, each of said nodes comprising one of said memory units;

each of said processing units providing a multiplicity of high-granularity virtual processors for carrying out processing operations on memory units of nodes terminating each branch provided with a respective processing unit and transfer operations therebetween, each memory unit comprising:
means forming a memory connection bus, for providing all processing units connected to the respective memory unit with memory access,
means forming an interprocess control block, for routing control commands from a virtual processor of a respective processing unit to a virtual processor of another processing unit, both processing units being connected to the respective memory unit by said memory connection bus, and each of said processing units comprises:
a program activation unit comprising a program address stack and control means for current instruction address computation and emission of instruction retrieve orders from a memory unit connected to the respective processing unit, for execution of jumps and for program state changes based on control indicators used in control of the respective processing unit, and acting as a mixer of processing programs which, by a cyclical scanning of said program address stack delivers in successive cycles one instruction or two instructions of each processing program to generate a processing flow which shares all resources of the respective processing unit,
a memory instruction reading unit connected to said program activation unit and including a cache memory, and which takes instruction retrieve orders from the program activation unit and retrieves instructions from a connected memory unit or from its cache memory,
instruction buffers connected to said memory instruction reading unit and which receive instructions retrieved by said memory instruction reading unit,
an order interpretation block connected to said instruction buffers, said order interpretation block including interpretation units for order interpretation block processing throughput, and receiving instructions from the instruction buffers, interpreting received instructions and computing operation type, register-operand addresses, execution indicators and memory-operand addresses, except for jump instructions when a jump address is sent to the program activation unit where a jump operation is executed,
a general register block operatively connected to said order interpretation block, said general register block including general registers, and two access gates, controlled by a priority access mechanism for reading and writing, a memory operand reading unit operatively connected to said general register block and including cache memory, for retrieving operands from a connected memory unit or from a respective cache memory, a register access buffer block connected to general register block add to said order interpretation block and which receives from said order interpretation block an operation type, register-operand addresses and execution indicators and the operation type register-operand and sends addresses and execution indicators to said general register block, a memory access buffer block, connected to said order interpretation block and to said memory operand reading unit and which receives from said order interpretation block memory-operand addresses and sends them to said memory operand reading unit for operand retrieval, a register-operand buffer block connected to said register access buffer block for storing operation type, register-operands, register-operand address and execution indicators emitted by said register access buffer block and general register block, a memory-operand buffer block connected to said memory operand reading unit and which stores memory operands emitted by said memory operand reading unit, a data bus connecting said general register block and said register-operands buffer block, a data bus connecting said memory operands reading unit and said memory operands buffer block, an execution block connected to said data buses, including execution units, specialized as to operation types and whereby, for each execution unit type, said execution units being in a number significant for execution block processing throughput per operation type and receiving operation type, register-operands, register operand addresses and execution indicators from the register-operand buffer block and the memory operands from the memory operand buffer block, and executing the operation and determining operation result, in conformity with said execution indicators, and a result register address from the register-operand addresses, a transfer block, including transfer units receiving transfer orders and result register address from said order interpretation block and transfer parameters from said general register block, and executing a data transfer between two memory units to which the respective processing unit is connected, under the transfer orders and the transfer parameters, and updating, after completing the data transfer, the transfer parameters, a control system connected to said data buses and comprising means for control of the respective processing unit, said control indicators, and all of the buffers and buses of the respective processing unit, based on indicators, addresses and labels for the instructions and operands thereof, unit components, and a record block storing said control indicators, a register writing buffer block which receives said operation result and a result register address from the execution block or said transfer parameters and result register address, and writes them in the general register block and in same time updates control indicators stored in said record block, a data bus connecting said execution block or said transfer block and said register writing buffer block, and a control unit which receives control commands from a memory connection bus connecting the processing unit to respective memory units, and performing operations of start, stop and testing of the processes within the processing unit, to each process being allocated one virtual processor obtained by unit processing resource sharing.

\* \* \* \* \*